United States Patent

[11] 3,576,142

[72] Inventor John Matthews
Scranton, Pa. (16 Hall Ave. Clarks Green, Penna.)
[21] Appl. No. 824,932
[22] Filed May 15, 1969
[45] Patented Apr. 27, 1971

[54] HOUSING FOR MOTION TRANSMISSION MECHANISM
2 Claims, 4 Drawing Figs.

[52] U.S. Cl. ................................................... 74/606, 74/611
[51] Int. Cl. .................................................... F16h 57/02
[50] Field of Search ........................................... 74/606, 611, 609, 608, 219

[56] References Cited
UNITED STATES PATENTS
1,911,531 5/1933 Roderwald .................. 74/611
2,336,884 12/1943 Ottoson ...................... 74/611X Primary Examiner—Frederick L. Matteson
Assistant Examiner—F. D. Shoemaker
Attorney—Robert P. Williams ABSTRACT: A housing for enclosing a motion transmission mechanism includes spaced bearing means for supporting parallel shafts and means for moving one of the bearings in a direction radially of the other in order to adjust the motion-transmitting means. Unique lubrication means are provided for the bearing which is uppermost in normal operation.

PATENTED APR 27 1971

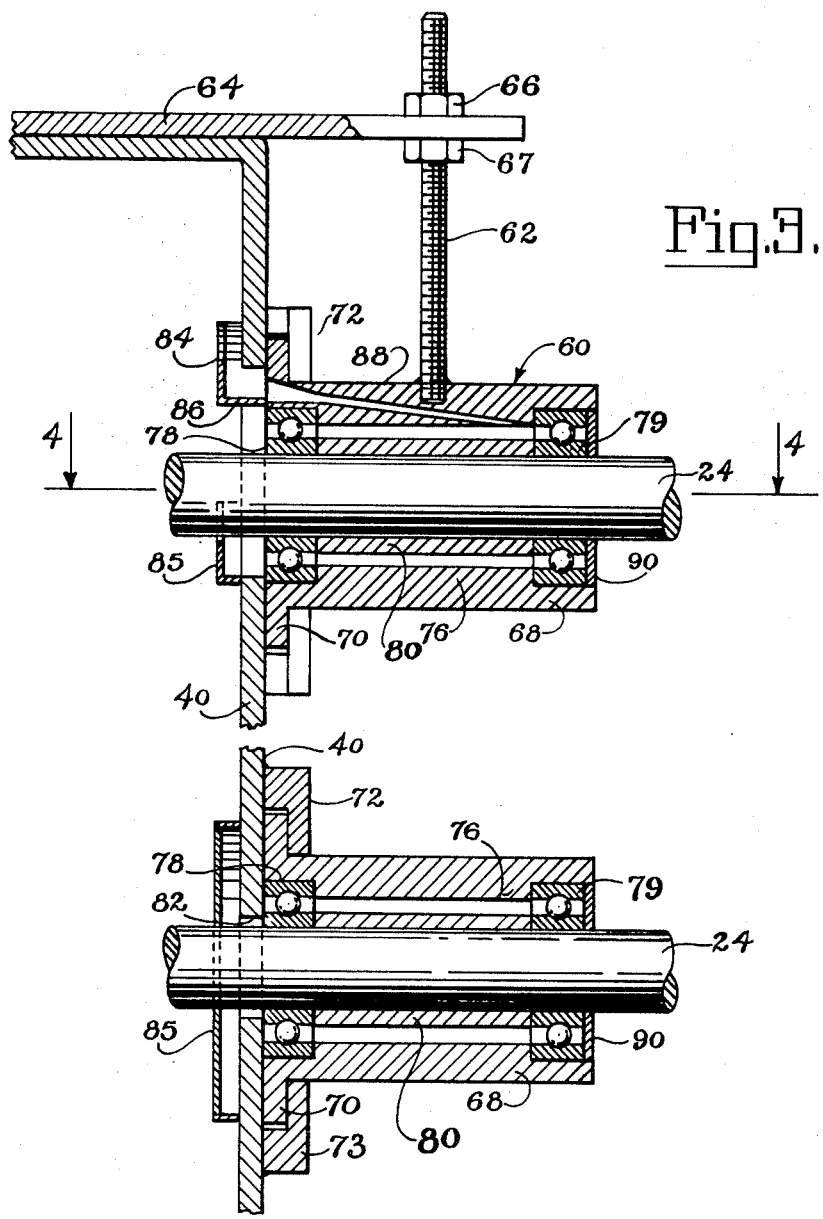

3,576,142

HOUSING FOR MOTION TRANSMISSION MECHANISM

BACKGROUND OF THE INVENTION

This invention relates to motion transmission mechanisms of the type including spaced parallel shafts and means such as an endless chain for transmitting motion between the shafts. More particularly, the invention pertains to an enclosing housing for such a mechanism.

SUMMARY OF THE INVENTION

It is an object of this invention to provide a housing for a motion transmission mechanism, which will provide increased safety in the use of the mechanism and which, in addition, will provide adjustability and lubrication of the drive elements associated therewith.

This object is achieved in the present novel housing by a construction which includes a housing member having a main wall and a peripheral sidewall, a closure member for said housing member, and bearing means associated with said housing member, said bearing means including a fixed bearing for a first cylindrical shaft and a movable bearing for a second cylindrical shaft. Means are provided for adjusting the movable bearing controllably in a direction radially of the fixed bearing. The present novel housing also includes means for pivoting the entire housing about the axis of the fixed bearing and for securing the housing in place in adjusted position.

THE DRAWINGS

FIG. 3 is an enlarged cross-sectional view of a portion of the section of FIG. 2;

FIG. 4 is a horizontal cross-sectional view through a portion of the present novel housing.

THE PREFERRED EMBODIMENT

Figure 1:
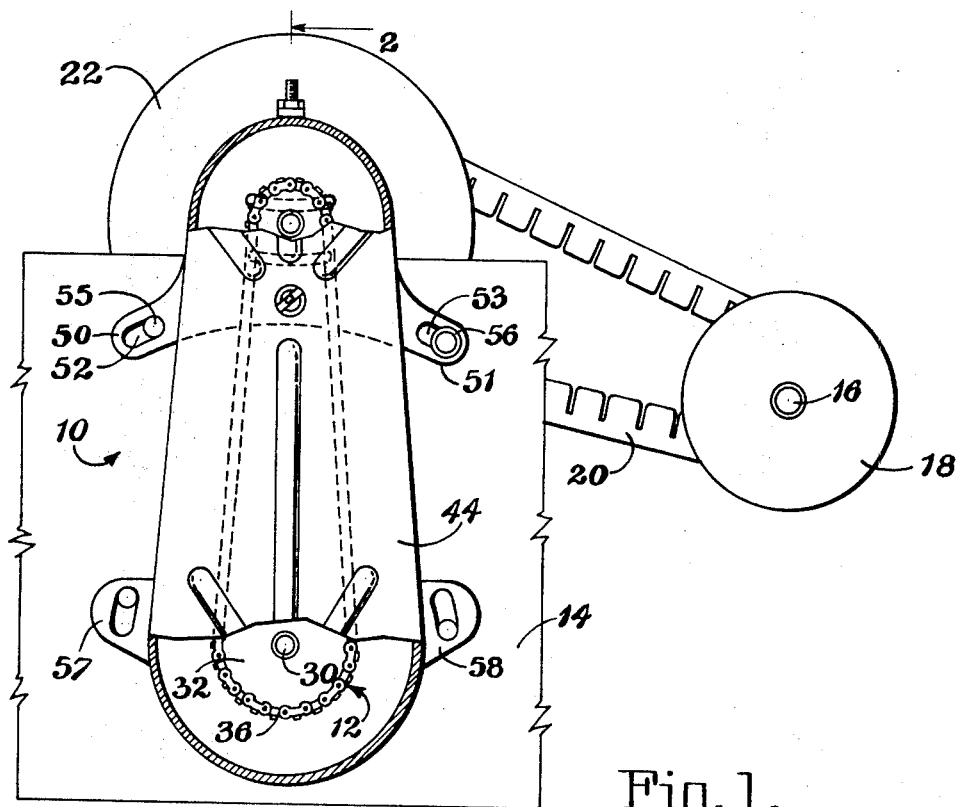
FIG. 1 is a vertical elevational view, partly in section of the present novel housing, showing its relationship to a drive mechanism including parallel input, intermediate, and output shafts.
Figure 2:
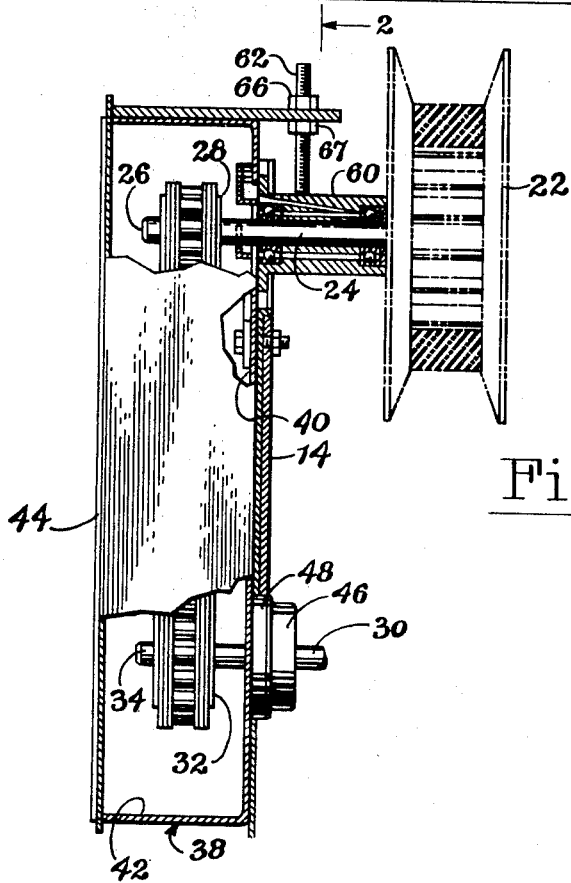
FIG. 2 is a section taken on the line 2—2 of FIG. 1.

The present device is indicated generally by the reference numeral 10 in FIG. 1 in association with motion-transmission elements including a chain drive assembly 12. The present housing 10 is adapted to be used on machinery which includes a chassis or framework, suggested by a mounting plate 14 in the drawings.

A main drive shaft 16, which appears in end view in FIG. 1, carries a pulley 18 for a belt 20, which is in turn connected to a driven pulley 22. The pulley 22 is mounted on an intermediate shaft 24 which carries, adjacent to its other end 26, a sprocket 28 for the chain drive assembly 12. An output shaft 30 is spaced from and parallel to the shaft 24 and carries a sprocket 32 adjacent to its end 34. The sprockets 28 and 32 are interconnected by a chain 36 which transmits motion from the shaft 24 to the shaft 30. It should be understood that the parts which have been described thus far are not part of the present invention.

The housing 10 of the present invention is a safety and lubrication housing for those parts of the mechanism which may be termed the chain drive assembly thereof. The housing 10 provides bearing support for the shafts 24 and 30 and also includes means for adjusting the tension in the belt 20 and in chain 36.

The housing includes a main housing member 38 which has a rear wall 40 and a peripheral sidewall 42 forming an elongated hollow chamber. The edge of the wall 42 is closed by a cover member 44 which is secured to the main housing member 38 in any desired manner. Preferably there is a gasket (not shown) between the cover member 44 and the main housing 38 to seal the housing. The shape of these parts is such that the peripheral wall 42 is generally parallel to the outline of the chain drive assembly 12.

Near the lower end of the housing 38, the rear wall thereof carries a bearing block 46 for the output shaft 30. The bearing block 46 has suitable internal bearing surfaces for the shaft 30 and an external bearing surface 48 which may be received in an opening in the chassis 14 by which the entire casing 38 is rendered pivotal about the axis of the shaft 30 to tighten the belt 20. A pair of lugs 50 and 51 extend laterally from the casing 38. These lugs are provided with elongated slots 52 and 53 respectively which may receive bolts such as the bolts suggested at 55 and 56 which pass through the chassis 14 and may be used to secure the housing 38 in place. Additional lugs 57 and 58 may be provided if desired to increase the rigidity of the mounting of the housing 10 on the chassis 14.

A bearing assembly 60 is slidably mounted on the wall 40 of the casing 38 for adjusting the tension in the chain 36. The position of the bearing assembly 60 with respect to the casing 38 may be adjusted and fixed in adjusted position by means of a threaded post 62 secured to and extending from the bearing assembly 60. This threaded post passes through an aperture in a plate 64 attached to the top of the peripheral wall 42 of the casing 38. Nuts 66 and 67 are threadedly engaged with the rod 62 to lock the bearing in adjusted position.

The details of the upper bearing assembly 60 are illustrated in FIGS. 3 and 4. As shown, the bearing assembly 60 includes a bearing block 68 which has a flange 70 adapted for sliding engagement within a pair of channeled guides 72 and 73 which are secured to the rear wall 40 of the casing 38. There is an aperture 76 through the bearing block 68 and roller bearing assemblies 78 and 79 are provided for supporting the shaft 14. A sleeve 80 may be provided for holding the inner races of the bearing assemblies 78 and 79.

As best seen in FIG. 4, the shaft 24 passes through the wall 40 of the casing 38 through an elongated slot 82 therein. The length of the elongated slot 82 is such that the shaft 24 can be moved through a substantial degree of travel in order to tighten the chain 36.

The diameter of the bearing block 68, and the flange 70 thereof, should be such that the block is sufficiently large as to cover the slot and sufficiently larger than the slot to permit the block to move through substantial distances of adjustment without uncovering the slot. The housing 10 may then remain totally closed through all adjustments of the bearing block 68.

To provide lubrication for the bearings 78 and 80, upwardly-directed trough-shaped channel members 84 and 85 are secured to the rear wall 40 of the casing 38. The lower trough 85 will catch oil carried upwardly by the chain 36 and direct it through the slot 82 to the bearing assembly 78. The upper trough 84 has a tab portion 86 thereof which extends into the slot 82 to engage the bearing block 68 in slidable relation thereto. The bearing block 68 has an oil hole 88 therethrough which communicates between the trough 84 and a point near the bearing 80. Oil which is carried upwardly by the chain 36 from the lower portion of the casing 38 is caught by the trough 84 and flows through the oil hole 88 to the vicinity of the bearing 80. An oil seal 90 prevents leakage of the oil outwardly of the bearing block 68.

It should now be apparent that a novel chain guard housing has been described which provides a high degree of safety in that it totally encloses the chain drive mechanism and also provides for increased efficiency of operation since it provides lubrication and excellent bearing support for the shafts of a chain drive. Moreover, the device provides for complete adjustment of both a belt drive which delivers power to the chain drive assembly and to the chain drive itself.

I claim:

1. An enclosing housing for use with apparatus having a framework, a motive power source having a rotating output shaft on said framework, a flexible drive between said output shaft and an intermediate shaft parallel to said output shaft and a chain drive between said intermediate shaft and a driven shaft, said housing comprising:

a casing having a rear wall, a peripheral sidewall and a removable cover adapted to enclose said chain drive, said casing having an opening in said rear wall adapted to receive said driven shaft, and an elongated slot near the opposite end of said casing in said rear wall, the direction of elongation of said slot being parallel to a line joining the axis of said intermediate and said driven shafts, a bearing block for said driven shaft fixed to said rear wall adjacent to said opening, said bearing block having a cylindrical outer surface adapted to be received in a cylindrical aperture in said framework to mount said casing for pivotal movement about the axis of said driven shaft, means for attaching said casing to said framework in a fixed position of rotation about the axis of said driven shaft, a bearing block slidably attached to said rear wall adjacent to said elongated slot, said slidable bearing block being sufficiently large as to cover said elongated slot and being sufficiently larger than the extent of said slot to permit said bearing block to move through substantial distances without uncovering said slot, and means for fixing said adjustable bearing block in adjusted position with respect to said casing.

2. An enclosing housing as defined in claim 1 wherein said means for attaching said casing to said framework comprises at least one flange attached to said casing and having an elongated arcuate slot therein said arcuate slot having a center of curvature coincident with the axis of said cylindrical surface on said bearing block.